May 2, 1961  E. T. CLARKE  2,982,857
RADIATION MONITORING SYSTEM
Filed Jan. 21, 1959  2 Sheets-Sheet 1

INVENTOR.
ERIC T. CLARKE
BY
*Alfred H. Rosen*
ATTORNEY

May 2, 1961 E. T. CLARKE 2,982,857
RADIATION MONITORING SYSTEM
Filed Jan. 21, 1959 2 Sheets-Sheet 2
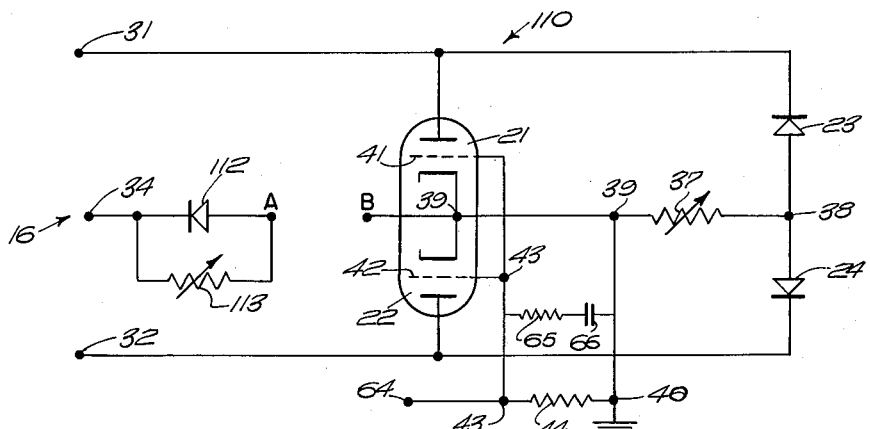
FIG. 3
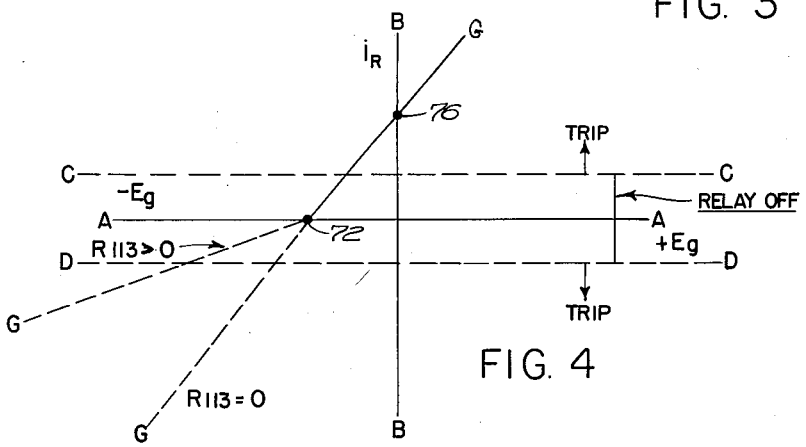
FIG. 4
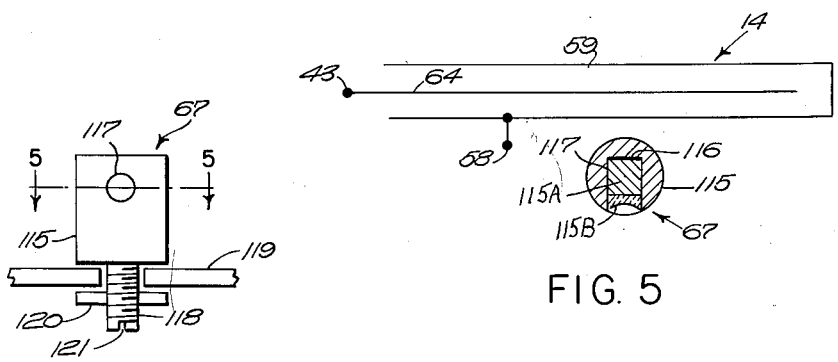
FIG. 5
FIG. 6
INVENTOR.
ERIC T. CLARKE
BY Alfred H. Rosen
ATTORNEY

United States Patent Office 2,982,857
Patented May 2, 1961

2,982,857

RADIATION MONITORING SYSTEM

Eric T. Clarke, Lexington, Mass., assignor to Technical Operations, Incorporated, Burlington, Mass., a corporation of Delaware Filed Jan. 21, 1959, Ser. No. 788,126

18 Claims. (Cl. 250—83.3)

This invention relates to radiation monitoring systems, and more particularly to a portable system for automatically and instantly warning of a dangerously high radiation level in a given region.

With industrial uses of radioactive sources becoming increasingly common, need exists for a simple, reliable, fail-safe system for instantly warning of the presence of dangerous radiation. Preferably such a system should be portable, and should be able to be installed and used by unskilled persons. It is among the objects of my invention to provide a system having all these features, which will warn of defects in its own operation as well as of the presence of dangerous radiation, and which is readily adaptable to actuate automatic safety devices as well as to provide a warning.

According to the invention, a system including a relay circuit capable of being nulled or otherwise maintained in a unique state at a desired operating point, such as a balanced bridge circuit, is provided with a radiation sensing circuit which is kept alive by a source of test radiation at a safely low level. The sensing circuit is connected to the relay circuit in such a way as to control its state and the relay circuit is adjusted to the unique state with the test radiation present. A relay operated switch or similar operator in the output of the relay circuit is then operated whenever the unique state is disturbed to a prescribed degree—this occurs not only when the radiation level increases but also when the sensing circuit indicates no radiation present, as when the radiation sensing circuit fails. The relay or other operator controls an indicator which provides an unmistakable signal, for example a steady green light when the system is operating normally and substantially the only radiation present is that of the test source, and a flashing red light whenever the relay circuit is off its unique state to a prescribed degree. The same operation which actuates the danger signal may be employed to actuate other safety devices. Other and further objects and features of the invention will become apparent from the following description of certain embodiments thereof. This description refers to the accompanying drawings, wherein:

Fig. 3 is another circuit according to the invention;

Fig. 4 is a graph to explain the operation of Fig. 3; and

Figs. 5 and 6 illustrate a detail of the invention.

Figure 1:
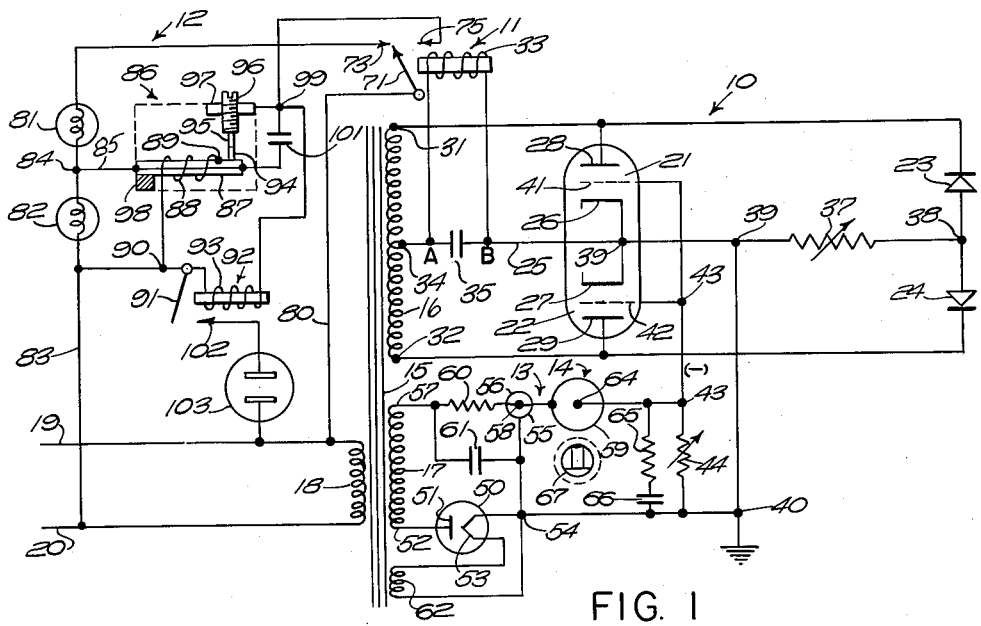
Fig. 1 illustrates a radiation monitoring circuit according to the invention.

In Fig. 1 a relay circuit in the form of a balanced-bridge circuit indicated generally at 10 includes a relay 11 which controls an indicator and alarm circuit 12. The bridge circuit in turn is controlled by a radiation sensing circuit indicated generally at 13, the principal sensing element of which is a Geiger tube 14. A common transformer 15 supplies power to the bridge circuit 10 via a secondary winding 16 and to the sensing circuit 13 via a secondary winding 17. The primary winding 18 of the transformer is connected to a source of power (not shown) via main lines 19 and 20.

For convenience in understanding the operation of the invention, the bridge circuit 10 will be described first. The bridge comprises four arms, namely, triode electron tubes 21 and 22 and diodes 23 and 24. The triodes 21 and 22 can, as is well known, be contained in one envelope, for example in a type 12AU7 tube. A common cathode lead 25 is connected at one end to the junction 39 of both cathodes 26 and 27 of the triodes. The anodes 28 and 29 are connected, respectively, to the upper and lower ends 31 and 32 of the secondary winding 16 (as seen in the figure). The coil 33 of the relay 11 is connected at one end via reference point B to the common cathode line 25 and at the other end via reference point A to the center 34 of the secondary winding 16. A condenser 35 is connected in shunt with the relay coil 33. A variable balance resistor 37 is connected from the common junction 38 of the diodes 23 and 24 to the common junction 39 of the triode cathodes 26 and 27. This latter common junction 39 is connected to a ground terminal 40. The control grids 41 and 42 of the triodes are connected together at a common junction 43. A variable grid bias resistor 44 is connected between this common grid junction and the ground terminal 40. As will be explained below in discussing the sensing circuit 13, control signals are developed across this variable resistor.

In operation, the bridge circuit 10 is balanced or nulled so that there is no voltage across the relay coil 33 when the control grids 41 and 42 are maintained at a predetermined negative voltage value with respect to ground. This is accomplished by adjustment of the balance resistor 37 between the triode cathode common junction 39 and the diode common junction 38 to a value substantially equal to the resistance of each triode 21 and 22 at this predetermined negative grid voltage. During the half cycle of alternating energizing power when the upper end 31 of the secondary winding 16 is positive with respect to the lower end 32, the upper triode 21 and the lower diode 24 will conduct through the balance resistor 37. During the next half cycle the lower triode 22 and the upper diode 23 will conduct current through the balance resistor 37, and in the same direction in the resistor. The diodes 23 and 24 are essentially switches. During the half cycle when each of the diodes conducts, it is for all practical purposes a non-resistive conductor; during the next half cycle its resistance is for all practical purposes infinite. In each half cycle, therefore, the resistance of the conducting triode and of the variable balance resistor 37 alone need be considered. In the half cycle during which current which would tend to flow through the relay coil 33 in one direction around the loop from the upper end 31 of the secondary winding through the upper triode 21 and the common cathode conductor 25 back to the center tap 34, current also tends to flow in the opposite direction through the relay coil 33 around the loop from the center tap 34 through the common cathode junction 39, the balance resistor 37, and the lower diode 24 to the lower end 32 of the secondary winding 16. These opposing tendencies are made essentially equal to each other. This condition is evidenced by the magnitude of the voltage existing between the reference points A and B at which the relay coil 33 is joined in the bridge circuit. When the value of the balance resistor 37 is adjusted to be exactly or nearly exactly equal to the resistance of the upper triode 21 when it is conducting current, the two currents which tend to flow in opposite directions through the relay coil 33 will exactly or nearly exactly balance each other, and this voltage value will be zero or nearly zero; i.e. a null. In other words, since during one half cycle the upper triode section 21 is in one of the aforementioned current loops and the balance resistor 37 is in the other of those loops, equating the resistances of these two elements will cause the opposing currents in the relay coil 33 to cancel or null each other. During the reverse half cycle, identical conditions exist in the bridge 10; the lower triode 22 and the upper diode 23 are then used in the two loops in which opposing currents would tend to flow through the relay coil 33, and the balance resistor 37 then balances the resistance of the lower triode 22; this resistor is thus the balance or nulling resistor of the bridge circuit 10. Obviously, the variable resistor 37 can balance or null the bridge circuit at a wide variety of values of voltage applied to the control grids 41 and 42 of the triodes 21 and 22, respectively, with respect to ground 40.

The radiation sensing circuit 13 includes a rectifier tube 50 having its anode 51 connected to the lower end 52 (in the figure) of the secondary winding 17 and its cathode 53 connected to a junction point 54 which is connected to the ground terminal 40 and to one electrode 55 of a voltage reference tube 56. The upper end 57 of the secondary winding 17 is connected via a resistor 60 to the remaining electrode 58 of the voltage reference tube and to the outer shell 59 of the Geiger tube 14. A capacitor 61 is connected between the upper end 57 of the secondary winding 17 and the outer electrode 55 of the voltage reference tube 56. An auxiliary secondary winding 62 of the transformer 15 provides heater power to the cathode 53 of the rectifier tube 50. The rectifier 50 is poled to maintain the outer shell 59 of the Geiger tube 14 negative with respect to ground 40. The voltage reference tube 56, in the present embodiment, maintains the value of this negative voltage at about 900 volts. Suitable tubes for use in this radiation sensing circuit are type 5841 voltage reference tube, type Anton 309 Geiger tube, and type 1V2 rectifier tube.

The inner electrode 64 of the Geiger tube 14 is connected to the junction 43, to which the grids 41 and 42 of the triodes 21, 22, respectively, of the bridge circuit 10, and one end of the variable grid bias resistor 44, are connected. A resistance-capacitance filter comprising a resistor 65 and capacitor 66 in series are connected in shunt with the variable resistor 44. A source of keep-alive radiation 67 is provided adjacent the Geiger tube 14, and functions to keep a small current flowing through this tube at all times while the system is in operation. There is therefore sufficient current flowing through the Geiger tube 14 and the bias resistor 44 between it and ground 40 during operation of the circuit, in the absence of external radiation, to provide that the junction 43 of the grids 21 and 22 in the bridge circuit 10 is always a few volts negative with respect to ground 40. A more detailed description of the radiation source 67 and the manner in which it is used is set forth below.

Figure 2:
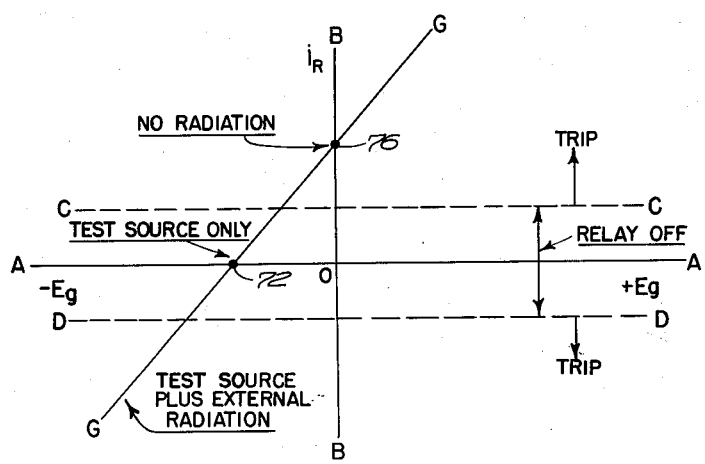
Fig. 2 is a graph to explain the operation of Fig. 1.

The operation of the embodiment of Fig. 1, as thus far described, will be explained now with reference to Fig. 2. In Fig. 2 a horizontal axis A—A represents voltage on the grids 41 and 42 of the triodes 21 and 22, respectively. The intersection of the horizontal axis A—A with a vertical ordinate B—B, at 0, represents the 0 voltage level with respect to ground 40 in Fig. 1. Negative voltage values are indicated by $-E_g$ and positive voltage values are indicated by $+E_g$, all relative to ground 40 in Fig. 1. The vertical ordinate B—B represents current in the relay 32, which is indicated by the reference character $i_R$. The direction of current in this relay is not material, since the relay will pick up its switch armature 71 when the current in the coil 33 exceeds a predetermined value, regardless of the current direction. In Fig. 2 dotted horizontal lines C—C and D—D represent the current values at which the relay 11 will trip and pick up its armature 71. Values of current less than the values represented by lines C—C and D—D, whether positive or negative, are "relay off" values, i.e. values in the null or unique state region; "trip" values must be outside of this region, that is, greater in either a positive or negative direction than values in the null or unique state region.

When the keep-alive source 67 in Fig. 1, indicated as "test source" in Fig. 2, is present and properly adjusted, a grid voltage value, indicated by a dot 72 in Fig. 2, somewhere in the $-E_g$ region, is applied to the grids 41 and 42. The balance resistor 37 is then adjusted to bring the relay current $i_R$ to a null value, for example to the 0 value on the horizontal axis A—A. In this condition, with only the radiation from the test source 67 present, there is little or no current in the relay 11 and its armature 71 drops out and comes to rest on the "de-energized" switch contact 73 (Fig. 1). Should the level of radiation presented to the Geiger tube 14 increase, the current through it would increase, and the voltage on the grids 41 and 42 would move further into the negative grid voltage value region, that is, in the direction of larger magnitudes of $-E_g$ in Fig. 2, so that the triodes 21 and 22 would become less conductive. That is, the resistances of the triodes 21 and 22 would become greater than the resistance of the balance resistor 37. The bridge 10 would then become unbalanced; this condition is indicated by the sloped curve G—G in Fig. 2. As the grid voltage value is increased in the negative direction, a point is reached at which current through the relay 11 increases to a sufficient extent to trip the relay, and it picks up its armature 71 and close it on the "energized" contact 75 (as shown in Fig. 1). This region is indicated by the words "test source plus external radiation" in Fig. 2.

Should the Geiger tube fail, or should the radiation source 67 become depleted or damaged, or should the normal negative grid bias voltage which is continuously present on the grids 41 and 42 for any reason vanish, the triodes 21 and 22 would become more conductive, due to the presence of grid voltage equal to or approaching the 0 grid voltage value 76, shown in Fig. 2 precisely on the ordinate B—B. At this grid voltage value the current flow through the relay 11 would again be sufficient to cause it to pick up its armature 71 and close it on the "energized" contact 75.

This energized condition of the bridge circuit relay 11 exists when the system is first energized, until the tubes 21 and 22 become conductive under control of the negative bias derived from the test source 67, as well as when there is a failure of these tubes or of any of the components supplying the grid bias voltage. Inasmuch as the most common failure in Geiger tube equipment is the Geiger tube itself and its supply, this provision of identical action both during the presence of external radiation and in the case of failure of components which are critical in the radiation detecting circuits is a valuable safety feature for equipment of this kind.

Referring again to Fig. 1, the indicator and alarm circuit 12 is controlled by the armature 71 of the relay 11. This circuit is connected across the input main lines 19 and 20. It is traced from the first main line 19 to the armature 71 via line 80 and, when the relay 11 is in the de-energized condition, as shown, through the "de-energized" switch contact 73 directly to a first electric lamp 81 and therethrough to a second electric lamp 82, and return via line 83 to the second main line 20. At the junction 84 of the two lamps 81 and 82 there is a lead 85 to a flasher switch indicated generally at 86. The flasher switch comprises a bimetallic element 87 around which there is wound a heater coil 88 which is connected at one end 89 to the bimetallic member. The lead 85 from the junction 84 is also connected to the bimetallic member. The other end of the heater coil 88 is connected by way of a junction 90 to the return line 83 and to the switch armature 91 and one end of the coil 93 of a relay 92. The bimetallic element 87 of the flasher switch 86 mounts a switch contact 94 which cooperates with an adjustable contact 95, which in turn is held at the end of an adjustable screw 96 in a threaded collar 97. The collar 97 and a support 98 for one end of the bimetallic element 87 are fixed relative to each other. The "energized" contact 75 of the bridge relay 11 is connected at a junction 99 to the threaded collar 97 and to the remaining end of the coil 93 of the relay 92 in the indicator and alarm circuit 12. A capacitor 101 bypasses the flasher switch contacts 94 and 95, for the usual purpose of preventing sparking when they are opened. The indicator and alarm circuit relay 92, when energized, closes its armature 91 on its single contact 102 and provides source power from the mains 19 and 20 to an electrical outlet 103. For the purposes which are about to be described the first lamp 81 is preferably green and the second lamp 82 is red. Suitable wattage values for these lamps, when the source power is at 115 volts, are 40 watts for the green lamp and 100 watts for the red lamp.

When the bridge relay 11 is de-energized, and its armature 71 is closed on the "de-energized" contact 73, current from the main flows through line 80, switch contact 73 and the two lamps 81 and 82 in series back through line 83 to the mains. The green lamp 81 being of lower wattage and therefore higher resistance than the red lamp 82, the green lamp will glow with substantially its full rated brilliance and the red lamp will be hardly visible, although upon close inspection it will be seen to be glowing very dimly. The indicator and alarm circuit 12 is then in a condition in which it indicates a safely low radiation level in the vicinity of the Geiger tube 14. Should the relay 11 for any reason become energized, either because of an increase in the external radiation level or because of a failure of one of the critical components of the systems as described above, or because the system has just been turned on, the relay 11 will be energized and close its armature 71 on its "energized" contact 75. In this condition the main power is applied from the line 19 through line 80 and the armature 71 to the "energized" contact 75 and thence to junction 99 where current is supplied in parallel to the adjustable flasher switch contact 95 and the coil 93 of the indicator and alarm circuit relay 92. Current flows through the coil 93 into the junction 90 and thence by way of the return line 83 to main line 20. This current causes the armature 91 to be picked up and close a circuit from the main line 19 through the receptacle 103, contact 102 and armature 91 back to junction 90 and thence through the return line 83 to line 20. The receptacle is now able to energize an alarm circuit or close a door or perform any other function which it is desired to perform upon the external radiation level becoming dangerous. At the same time voltage applied to the junction 99 and the adjustable flasher switch contact 95 passes current through the cooperating switch contact 94, junction 89 and the heater coil 88 of the flasher switch 86, thence to the junction 90 and via line 83 back to line 20 of the source. Simultaneously, current flows through the bimetallic element 87 and via the connecting line to the red light 82. The circuit to the green light 81 is broken at the time the bridge relay 11 picks up its armature 71. The red light 82 is lighted and remains lighted at its full rated brilliance until the bimetallic element 87 is sufficiently heated to break the contact between the flasher contacts 94 and 95. The red light circuit is then broken, and remains broken until these contacts are closed; with suitable adjustment of the flasher switch 86, by turning the screw 96, the rate of flashing can be adjusted to any desired number of flashes per minute of the red light 82.

Fig. 3 shows another embodiment of the invention, in which a balanced-bridge type of relay circuit shown generally at 110 takes the places of the balanced-bridge circuit 10 of Fig. 1. The balanced-bridge circuit 110 of Fig. 3 is identical in all essential respects to the balanced-bridge circuit 10 of Fig. 1, except that a diode 112 and a shunting variable resistor 113 are connected between relay connection point A and the center tap 34 of the secondary winding 16 and the bias resistor 44 is fixed. Elements of Fig. 3 which are identical to elements in Fig. 1 bear the same reference characters. Fig. 3 is illustrated only to the extent required to explain the difference between the balanced-bridge 110 and the balanced-bridge 10 of Fig. 1; unnecessary illustration has been intentionally left out of the figure.

When the value of the variable resistor 113 is set to 0 ohms, the balanced-bridge circuit 110 of Fig. 3 functions identically to that of Fig. 1. However, when this resistor has a finite value greater than 0, the operation is different, as will now be explained. The rectifier 112 is poled so that current can flow through it from reference point A to the center tap 34 more easily than in the reverse direction; that is, the rectifier has substantially 0 resistance to current flow from right to left in Fig. 3 and a comparatively infinite resistance to current flow from left to right in the same figure.

The variable resistor 113 shunting the diode 112 is the sensitivity adjustment for the circuit of Fig. 3, in place of the variable resistor 44 in Fig. 1. The use of the variable resistor 44 to adjust sensitivity as shown in Fig. 1 renders it necessary to readjust balance whenever the sensitivity is adjusted, so that in Fig. 1 the resistors 44 and 37 must both be adjusted to achieve optimum conditions. In Fig. 3 balance is not disturbed when the bias adjustment is altered.

Referring to Fig. 4, the reference axes A—A, B—B, C—C and D—D are the same as the correspondingly referenced axes in Fig. 2. The "relay off" and "relay trip" conditions are indicated in the same manner in Fig. 2. Likewise, the initial grid bias potential indicated by the point 72 on the axis A—A represents the test source only condition and the 0 grid bias potential represented by point 76 on the B—B ordinate represents the "no radiation" condition, in which the relay 11 is tripped. When the grid bias reaches 0 the tubes 21 and 22 become more conductive and pass increasingly large current through the diode 112 in the direction in which the diode represents a substantially 0 resistance. Therefore, the condition under which no radiation is present, or under which the bias on the grids of the triodes 21 and 22 goes to 0, is a condition under which the introduction of the diode 112 has no substantial effect. Accordingly, the curve G—G is the same in Fig. 4 as in Fig. 2, from the reference axis A—A, that is, from the test source bias point 72, upward as shown in Fig. 4. However, when negative bias is increased on the grids 41 and 42, current through the tubes 21 and 22 decreases as compared with current through the balance resistor 37 and one or the other of the diodes 23 and 24, whose resistances are not changed when the grid bias is changed. This latter current, however, attempts to flow in the back direction through the diode 112 and if the bias resistor 113 is set at a value greater than 0, this current will not be able to increase as rapidly for a given increase in external radiation as it would had the bias resistor been set to 0. In other words, a greater increase in the ambient radiation level is required to cause a given increase in current through the relay 11 than would be required had the bias resistor 113 been set to 0. This is indicated in Fig. 4 by the dotted line portion of the sloped line G—G, below the point 72 representing test source bias. When the value of the resistance of relay 113 is 0, indicated by the legend $R_{113}=0$ in Fig. 4, this portion of the curve G—G is identical to the corresponding portion of this curve in Fig. 2; however, when $R_{113}$ is greater than 0, the curve G—G takes a slope which approaches the horizontal attitude of the reference axis A—A, becoming more and more nearly parallel to this axis as the value $R_{113}$ is increased. Thus, without altering the balance of the bridge circuit 110, this circuit can be adjusted in sensitivity over a wide range. In fact, sensitivity can be made so low by increasing the value of the bias resistor 113 to an extremely large value, and choosing a diode 112 which has an extremely large value of back resistance, that only a tremendous change in ambient radiation will cause the circuit to indicate a dangerous radiation level.

Referring to Figs. 5 and 6, Fig. 5 shows diagrammatically a horizontal view of the Geiger tube 14. The envelope 59 is connected to the negative voltage point 58 of the voltage reference tube 56 (Fig. 1) and the inner conductor 64 is connected to the point 43 (Fig. 1) to which the grids 41 and 42 are connected. The test source 67 comprises a cylinder 115, which may be made of aluminum, having a hole 117 bored somewhat more than half-way through it. A suitable source of radiation in the form of a thin wafer 116 of radioactive material is placed in the bottom of this hole. A plug 115A, which also may be made of aluminum, is inserted in the hole 117 over the wafer 116, and the remainder of the hole is sealed with a suitable potting compound 115B. The cylinder 115 has a coaxial stem 118 (Fig. 6) which is threaded and passes through a bore in a plate 119. A nut 120 on the stem serves to lock the cylinder against the plate and hold it from turning. The plate, which is shown in Fig. 6 but not in Fig. 5, is conveniently a portion of the chassis on which the circuit is constructed or supported and if the Geiger tube 14 lies on this chassis, a hole bored through it suffices to support the test source 67. By loosening the nut 120 slightly and placing a screwdriver in the slot 121 at the end of the stem 118, it is possible to rotate the cylinder 115 so that the wafer 116 confronts the Geiger tube 14 parallel to it or at an angle to it, or so that the wafer 116 is located in one of two positions parallel to the Geiger tube in which it is nearer to or farther away from the Geiger tube. The same result can be obtained by centering the wafer 116 on the axis of the cylinder 115 and locating the stem 118 eccentrically with respect to the cylinder, or by a combination of eccentric wafer 116 and eccentric stem 118. By adjusting the test source 67 to a desired but small radiation level, substantially below the dangerous radiation level which the system is intended to monitor, the system provides a keep-alive which assures at all times that the Geiger tube 14 is functioning. If for any reason the Geiger tube fails to function, the red light 82 will be lighted in place of the green light 81, as has been explained above.

It will be appreciated that the circuits of my invention will fail safe under practically all conceivable conditions. As has been explained, if the critical elements, namely the Geiger tube and its control circuits, should fail, the red light would be lighted in place of the green light. It will be noticed also that the two lamps 81 and 82 are in series with each other, so that if the filament of either one is open, neither will be lighted when conditions are such that the green light should be lighted. It is preferred for the purposes of the present invention to employ as the red light a traffic duty lamp, which is a variety of electric lamp having extremely high durability and a filament which is suspended in a long arc from its supporting wires. Such a lamp is rarely known to fail and like most incandescent lamps when it does fail it results in an open circuit rather than a short circuit. This failure will always be made apparent during "safe" radiation conditions by the failure of the green light to be lighted, so that a failure of the red light will not go undetected during times of "safe" radiation levels. Thus, the system is so designed that when it is first turned on and until all the parts are operating properly the red light is lighted, and thereafter, if the supervised radiation is at a "safe" level, the red light goes out and the green light is lighted, provided all the critical parts are operating properly. Should the red light fail to light when the system is first turned on, or should the green light fail to light and to remain lighted after the red light is extinguished, it will be known that the system has failed to operate.

This completes the description of the foregoing embodiments of the invention. The embodiments which have been illustrated and described herein are illustrations only of the invention, and other embodiments and modifications will occur to those skilled in the art. No attempt has been made herein to go into all possible embodiments of the invention, but rather only to illustrate its principles in the best manner presently known to practice it. It is obvious that the concepts of this invention can be implemented in a number of additional configurations without departing from the spirit of the invention which is encompassed in the following claims.

What is claimed is:

1. Radiation monitoring system comprising a relay circuit capable of being maintained in a unique state under a given set of operating conditions, a radiation sensing circuit having a radiation sensing element and connected to control the state of the relay circuit, a source of bias radiation operatively associated with said sensing circuit, said source providing radiation at a level within upper and lower prescribed limits, means to adjust said relay circuit substantially to said unique state when the total radiation sensed by said element is at a level between said limits, said relay circuit being characterized by departure in a prescribed direction from said unique state when the total radiation sensed by said element is at a level which is not between said limits, an operator in said relay circuit adapted to be maintained in a first condition when said relay circuit is substantially in said unique state and in a second condition when said relay circuit is not substantially in said unique state, and an indicator controlled by said operator.

2. Radiation monitoring system comprising a null circuit, a radiation sensing circuit having a radiation sensing element and connected to control the nulling of said null circuit, a source of bias radiation operatively associated with said sensing circuit, said source providing radiation at a level within upper and lower prescribed limits, means to adjust said null circuit to a substantially nulled condition when the total radiation sensed by said element is at a level between said limits, said null circuit being characterized by departure from said nulled condition to a prescribed degree when the total radiation sensed by said element is not between said limits, an operator in said null circuit adapted to be maintained in a first condition when said null circuit is substantially nulled and in a second condition when said null circuit departs from said nulled condition at least to said prescribed degree, and an indicator controlled by said operator.

3. Radiation monitoring system comprising a balanced-bridge circuit, a radiation sensing circuit having a radiation sensing element and adapted to provide a sensing signal of which a parameter is a function of the radiation level of said sensing element, said sensing signal being connected to control the balance of said bridge circuit, a source of bias radiation operatively associated with said sensing circuit, said source providing radiation at a level within upper and lower prescribed limits, means to set said bridge circuit in a substantially balanced condition when the total radiation sensed by said element is at a level between said limits, said bridge circuit being characterized by departure from said balanced condition to a prescribed degree when the total radiation sensed by said element is not between said limits, an operator in said bridge circuit adapted to be maintained in a first condition when said bridge is substantially balanced and in a second condition when said bridge departs from said balanced condition at least to said prescribed degree, and an indicator controlled by said operator.

4. Radiation monitoring system comprising a null circuit, a radiation sensing circuit having a radiation sensing element and connected to control the nulling of said null circuit, a source of bias radiation operatively associated with said sensing circuit, said source providing radiation at a level within upper and lower prescribed limits, means to adjust said null circuit to a substantially nulled condition in the presence of said bias radiation, said null circuit having a first off-null condition when the level of radiation reaching said sensing element exceeds said upper limit and a second off-null condition when said level is below said lower limit, an operator in said null circuit adapted to be maintained in a first condition when said null circuit is substantially nulled and in a second condition when said null circuit is in either of said off-null conditions, and an indicator controlled by said operator.

5. Radiation monitoring system comprising a relay circuit capable of being maintained in a unique state under a given set of operating conditions and including a pair of reversely-connected grid-controlled electron tubes, a radiation sensing circuit having a radiation sensing element and connected to the grids of said tubes to control the state of said relay circuit, a source of bias radiation operatively associated with said sensing circuit, said source providing radiation at a level within upper and lower prescribed limits, means to adjust said relay circuit to substantially said unique state when the total radiation sensed by said element is at a level between said limits, said relay circuit being characterized by departure in a prescribed direction from said unique state when the total radiation sensed by said element is at a level which is not between said limits, an operator in said relay circuit adapted to be maintained in a first condition when said relay circuit is substantially in said unique state and in a second condition when said relay circuit is not substantially in said unique state, and an indicator controlled by said operator.

6. In a radiation monitoring system a balanced-bridge circuit comprising first and second impedance controllable electric conductors joined at a first common junction and connected in series across a source of alternating electric energy, first and second substantially unidirectional conductors joined at a second common junction and connected in series across said source, means connected between said first and second junctions to adjust said bridge to a balanced condition, means to apply to said impedance controllable electric conductors a signal which adjusts their impedances, the controlling parameter of said signal being a function of the radiation level in a given region, said bridge being adjusted to be substantially balanced when said signal has a value between first and second limits which represent, respectively, the upper and lower limits of a range of radiation levels in said region, and to be unbalanced to a prescribed degree when said signal has a value outside said first and second limits, and signalling means connected between said first common junction and a point on said source intermediate its ends, said signalling means being characterized by two mutually exclusive operational states, and being adapted to assume one of said states when said bridge is substantially balanced, and to assume the other of said states when said bridge is unbalanced to said prescribed degree to either side of the balance region.

7. In a radiation monitoring system a balanced-bridge circuit comprising first and second impedance controllable electric conductors joined at a first common junction and connected in series across a source of alternating electric energy, each of said conductors being provided with a control element, first and second substantially unidirectional conductors joined at a second common junction and connected in series across said source, means connected between said first and second junctions to adjust said bridge to a balanced condition, means to apply to the control elements of said conductors a signal which adjusts their impedances, the controlling parameter of said signal being a function of the radiation level in a given region, said bridge being adjusted to be substantially balanced when said signal has a value between first and second limits which represent, respectively, the upper and lower limits of a range of radiation levels in said region, and to be unbalanced to a prescribed degree when said signal has a value outside said first and second limits, and signalling means connected between said first common junction and a point on said source intermediate its ends, said signalling means being characterized by two mutually exclusive operational states, and being adapted to assume one of said states when said bridge is substantially balanced, and to assume the other of said states when said bridge is unbalanced to said prescribed degree to either side of the balance region.

8. In a radiation monitoring system a balanced-bridge circuit comprising first and second electron tubes each having at least an anode, a cathode and a control grid, said cathodes being connected together at a first junction and said anodes being connected to respective sides of a source of alternating electric energy, first and second diodes joined at their anodes to a second junction and at their cathodes to said respective sides of said source, a variable resistor connected between said first and second junctions, means to apply to the control grids of said electron tubes a radiation sensing signal of which a parameter is a function of the radiation level in a given region, said bridge being adjusted to be substantially balanced when said signal has a value between first and second limits which represent, respectively, the upper and lower limits of a range of radiation levels in said region, and to be unbalanced to a prescribed degree when said signal has a value outside said first and second limits, and signalling means connected between said cathodes and a point on said source intermediate said two sides, said signalling means being characterized by two mutually exclusive operational states, and being adapted to assume one of said states when said bridge is substantially balanced, and to assume the other of said states when said bridge is unbalanced to said prescribed degree to either side of the balance region.

9. In a radiation monitoring system a balanced-bridge circuit comprising first and second electron tubes each having at least an anode, a cathode and a control grid, said cathodes being connected together at a first junction and said anodes being connected to respective sides of a source of alternating electric energy, first and second diodes joined at their anodes to a second junction and at their cathodes to said respective sides of said source, a variable resistor connected between said first and second junctions, a resistor connected between said first junction and the control grids of said electron tubes, means to apply across said last-named resistor a potential the magnitude of which is a function of the radiation level in a given region, said bridge being adjusted to be substantially balanced when said signal has a value between first and second limits which represent, respectively, the upper and lower limits of a range of radiation levels in said region, and to be unbalanced to a prescribed degree when said signal has a value outside said first and second limits, and signalling means connected between said cathodes and a point on said source intermediate said two sides, said signalling means being characterized by two mutually exclusive operational states, and being adapted to assume one of said states when said bridge is substantially balanced, and to assume the other of said states when said bridge is unbalanced to said prescribed degree to either side of the balance region.

10. In a radiation monitoring system a balanced-bridge circuit comprising first and second electron tubes each having at least an anode, a cathode and a control grid, said cathodes being connected together at a first junction and said anodes being connected to respective sides of a source of alternating electric energy, first and second diodes joined at their anodes to a second junction and at their cathodes to said respective sides of said source, a first variable resistor connected between said first and second junctions, a second variable resistor connected between said first junction and the control grids of said electron tubes, means to apply across said last-named resistor a potential the magnitude of which is a function of the radiation level in a given region, said bridge being adjusted to be substantially balanced when said signal has a value between first and second limits which represent, respectively, the upper and lower limits of a range of radiation levels in said region, and to be unbalanced to a prescribed degree when said signal has a value outside said first and second limits, and signalling means connected between said cathodes and a point on said source intermediate said two sides, said signalling means being characterized by two mutually exclusive operational states, and being adapted to assume one of said states when said bridge is substantially balanced, and to assume the other of said states when said bridge is unbalanced to said prescribed degree to either side of the balance region.

11. In a radiation monitoring system a balanced-bridge circuit comprising first and second impedance controllable electric conductors joined at a first common junction and connected in series across a source of alternating electric energy, first and second substantially unidirectional conductors joined at a second common junction and connected in series across said source, means connected between said first and second junctions to adjust said bridge to a balanced condition, means to apply to said impedance controllable electric conductors a signal which adjusts their impedances, the controlling parameter of said signal being a function of the radiation level in a given region, said bridge being adjusted to be substantially balanced when said signal has a value between first and second limits which represent, respectively, the upper and lower limits of a range of radiation levels in said region, and to be unbalanced to a prescribed degree when said signal has a value outside said first and second limits, signalling means connected between said first common junction and a point on said source intermediate its two ends, said signalling means being characterized by two mutually exclusive operational states, and being adapted to assume one of said states when said bridge is substantially balanced, and to assume the other of said states when said bridge is unbalanced to said prescribed degree to either side of the balance region, and a substantially unidirectional current conductor shunted by a variable resistor connected in series with said signalling means.

12. In a radiation monitoring system a balanced-bridge circuit comprising first and second impedance controllable electric conductors joined at a first common junction and connected in series across a source of alternating electric energy, each of said conductors being provided with a control element, first and second substantially unidirectional conductors joined at a second common junction and connected in series across said source, means connected between said first and second junctions to adjust said bridge to a balanced condition, means to apply to the control elements of said conductors a signal which adjusts their impedances, the controlling parameter of said signal being a function of the radiation level in a given region, said bridge being adjusted to be substantially balanced when said signal has a value between first and second limits which represent, respectively, the upper and lower limits of a range of radiation levels in said region, and to be unbalanced to a prescribed degree when said signal has a value outside said first and second limits, signalling means connected between said first common junction and a point on said source intermediate its two ends, said signalling means being characterized by two mutually exclusive operational states, and being adapted to assume one of said states when said bridge is substantially balanced, and to assume the other of said states when said bridge is unbalanced to said prescribed degree to either side of the balance region, and a substantially uni-directional current conductor shunted by a variable resistor connected in series with said signalling means.

13. In a radiation monitoring system a balanced-bridge circuit comprising first and second electron tubes each having at least an anode, a cathode and a control grid, said cathodes being connected together at a first junction and said anodes being connected to respective sides of a source of alternating electric energy, first and second diodes joined at their anodes to a second junction and at their cathodes to said respective sides of said source, a variable resistor connected between said first and second junctions, means to apply to the control grids of said electron tubes a radiation sensing signal of which a parameter is a function of the radiation level in a given region, said bridge being adjusted to be substantially balanced when said signal has a value between first and second limits which represent, respectively, the upper and lower limits of a range of radiation levels in said region, and to be unbalanced to a prescribed degree when said signal has a value outside said first and second limits, signalling means connected between said cathodes and a point on said source intermediate said two sides, said signalling means being characterized by two mutually exclusive operational states, and being adapted to assume one of said states when said bridge is substantially balanced, and to assume the other of said states when said bridge is unbalanced to said prescribed degree to either side of the balance region, and a substantially uni-directional current conducting diode shunted by a variable resistor connected in series with said signalling means.

14. In a radiation monitoring system a balanced-bridge circuit comprising first and second electron tubes each having at least an anode, a cathode and a control grid, said cathodes being connected together at a first junction and said anodes being connected to respective sides of a source of alternating electric energy, first and second diodes joined at their anodes to a second junction and at their cathodes to said respective sides of said source, a variable resistor connected between said first and second junctions, a resistor connected between said first junction and the control grids of said electron tubes, means to apply across said last-named resistor a potential the magnitude of which is a function of the radiation level in a given region, said bridge being adjusted to be substantially balanced when said signal has a value between first and second limits which represent, respectively, the upper and lower limits of a range of radiation levels in said region, and to be unbalanced to a prescribed degree when said signal has a value outside said first and second limits, signalling means connected between said cathodes and a point on said source intermediate said two sides, said signalling means being characterized by two mutually exclusive operational states, and being adapted to assume one of said states when said bridge is substantially balanced, and to assume the other of said states when said bridge is unbalanced to said prescribed degree to either side of the balance region, and a substantially unidirectional current conductor shunted by a second variable resistor connected in series with said signalling means.

15. In a radiation monitoring system, an indicator circuit comprising first and second incandescent lamps, a source of electric energy, a radiation controlled switch, said switch having a first contact closing a first circuit comprising said lamps in series across said source, and a second contact closing a second circuit comprising one of said lamps and a flasher switch in series across said source.

16. In a radiation monitoring system, an indicator circuit comprising first and second incandescent lamps, the wattage rating of said second lamp being of the order of twice that of said first lamp, a source of electric energy, a radiation controlled switch, said switch having a first contact closing a first circuit comprising said lamps in series across said source, and a second contact closing a second circuit comprising said second lamp and a flasher switch in series across said source.

17. Radiation monitoring system comprising a relay circuit capable of being maintained in a unique state under a given set of operating conditions, a radiation sensing circuit having a radiation sensing element and connected to control the state of said relay circuit, a source of bias radiation operatively associated with said sensing circuit, said source providing radiation at a level within upper and lower prescribed limits, means to adjust said relay circuit to substantially said unique state when the total radiation sensed by said element is at a level between said limits, said relay circuit being characterized by departure in a prescribed direction from said unique state when the total radiation sensed by said element is at a level which is not between said limits, an operator in said relay circuit adapted to be maintained in a first condition when said relay circuit is substantially in said unique state and in a second condition when said relay circuit is not substantially in said unique state, an indicator controlled by said operator, said indicator comprising first and second incandescent lamps, a source of electric energy, said operator in said first condition closing a first circuit comprising said lamps in series across said source and in said second condition closing a second circuit comprising one of said lamps and a flasher switch in series across said source.

18. In a radiation monitoring system a balanced-bridge circuit comprising first and second impedance controllable electric conductors joined at a first common junction and connected in series across a source of alternating electric energy, first and second substantially unidirectional conductors joined at a second common junction and connected in series across said source, means connected between said first and second junctions to adjust said bridge to a balanced condition, means to apply to said impedance controllable electric conductors a signal which adjusts their impedances, the controlling parameter of said signal being a function of the radiation level in a given region, said bridge being adjusted to be substantially balanced when said signal has a value between first and second limits which represent, respectively, the upper and lower limits of a range of radiation levels in said region, and to be unbalanced to a prescribed degree when said signal has a value outside said first and second limits, and signalling means connected between said first common junction and a point on said source intermediate its ends, said signalling means being characterized by two mutually exclusive operational states, and being adapted to assume one of said states when said bridge is substantially balanced, and to assume the other of said states when said bridge is unbalanced to said prescribed degree to either side of the balance region, said signalling means comprising first and second incandescent lamps, a switch controlled by said bridge circuit, said switch having a first contact closing a first circuit comprising said lamps in series across said source and a second contact closing a second circuit comprising one of said lamps and a flasher switch in series across said source.

References Cited in the file of this patent

UNITED STATES PATENTS

| | | |
|---|---|---|
| 2,648,015 | Greenfield et al. | Aug. 4, 1953 |
| 2,818,509 | Johnston | Dec. 31, 1957 |
| 2,884,530 | Foster | Apr. 28, 1959 |
| 2,884,539 | Swift | Apr. 28, 1959 |

UNITED STATES PATENT OFFICE
CERTIFICATE OF CORRECTION

Patent No. 2,982,857                             May 2, 1961

Eric T. Clarke

It is hereby certified that error appears in the above numbered patent requiring correction and that the said Letters Patent should read as corrected below.

Column 1, line 21, for "systm" read -- system --; column 2, line 39, after "conduct" insert -- current --; column 5, line 18, for "main" read -- mains --.

Signed and sealed this 31st day of October 1961.

(SEAL)
Attest:

ERNEST W. SWIDER
Attesting Officer

DAVID L. LADD
Commissioner of Patents

USCOMM-DC